United States Patent [19]

Kosaka et al.

[11] 4,293,423

[45] Oct. 6, 1981

[54] PROCESS AND APPARATUS FOR ION EXCHANGE BY USE OF THERMALLY REGENERABLE RESIN

[75] Inventors: Kenji Kosaka, Mitaka; Takeshi Iwatsuka, Funabashi; Ikuo Shindo, Mitaka; Akira Hotogi, Ichikawa, all of Japan

[73] Assignee: Rohm and Haas Company, Philadelphia, Pa.

[21] Appl. No.: 843,197

[22] Filed: Oct. 18, 1977

[51] Int. Cl.³ ............................................. B01D 15/04
[52] U.S. Cl. .................................. 210/676; 210/177; 210/189; 210/268
[58] Field of Search .................. 210/19, 30 R, 32, 33, 210/35, 37 R, 37 B, 38 R, 38 A, 38 B, 38 C, 71, 177, 181, 186, 189, 190, 191, 197, 268, 269, 279, 676

[56] References Cited

U.S. PATENT DOCUMENTS

| | | | |
|---|---|---|---|
| 2,719,206 | 9/1955 | Gilmore | 210/189 |
| 2,815,322 | 12/1957 | Higgins | 210/33 |
| 3,351,549 | 11/1967 | Bloch | 210/37 R |
| 3,549,526 | 12/1970 | Brown | 210/33 |
| 3,645,922 | 2/1972 | Weiss et al. | 210/30 R |
| 4,056,471 | 11/1977 | Fischer et al. | 210/186 |

*Primary Examiner*—Ivars C. Cintins

[57] ABSTRACT

Continuous or semi-continuous ion exchange treatment, such as desalination, is achieved by utilizing a column packed with a heterogeneous thermally regenerable ion exchange resin in a single bed divided into a loading zone, a heat displacement zone above the loading zone, and a resin regeneration zone above the heat displacement zone. In operation, feed liquid flows upwardly through the loading zone and the treated liquid is removed. Loaded resin is transferred from the loading zone to the regeneration zone, the resin bed then being displaced downwardly, counter-current to the flow of feed liquid. A hot regeneration liquid, which may be a portion of the treated liquid, is passed through the loaded resin in the regeneration zone for thermal regeneration of the resin.

16 Claims, 3 Drawing Figures

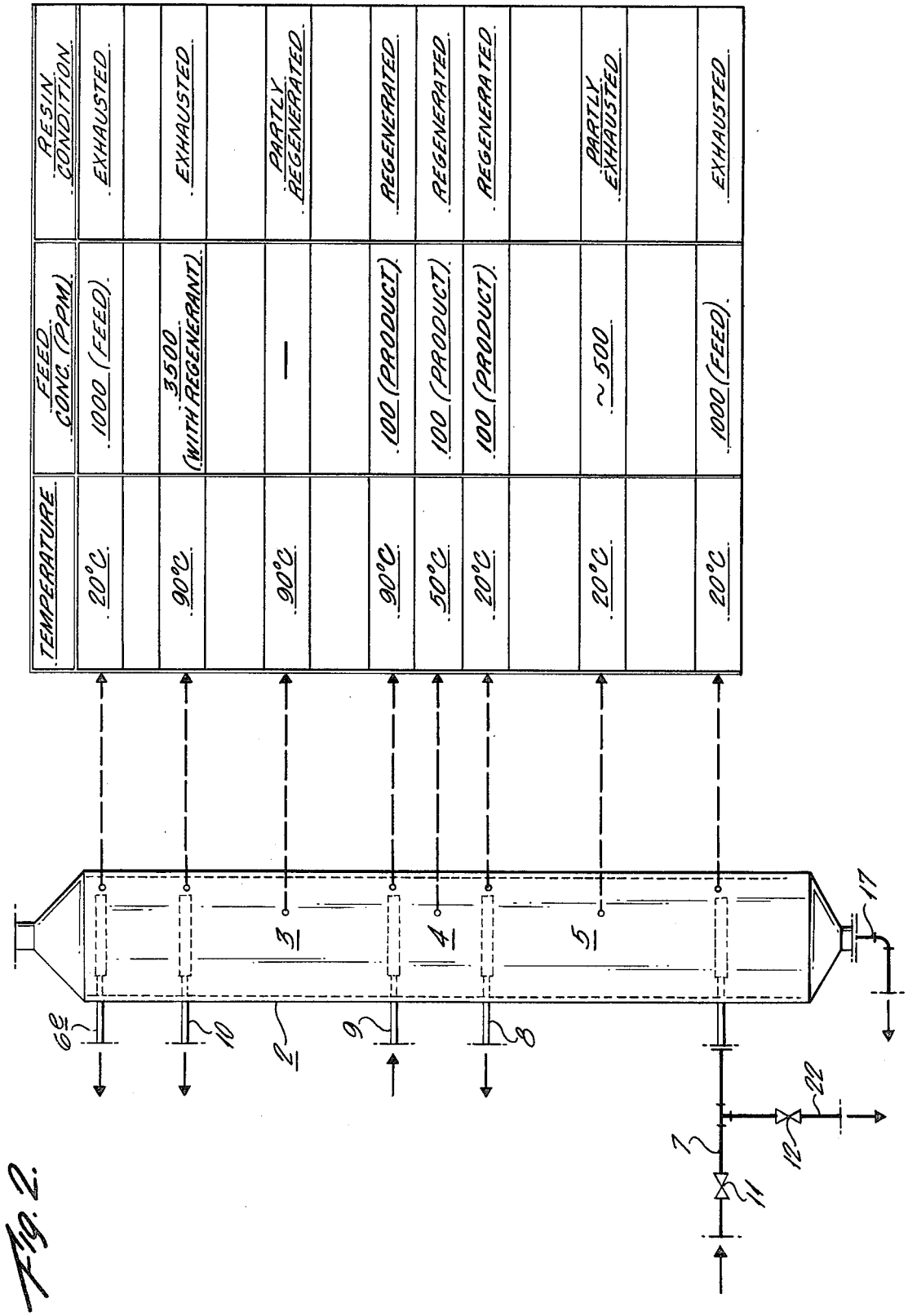

PROCESS AND APPARATUS FOR ION EXCHANGE BY USE OF THERMALLY REGENERABLE RESIN

BACKGROUND OF THE INVENTION

This invention relates to a process and apparatus for ion exchange by use of a thermally regenerable resin of a heterogeneous type, and more particularly to continuous or semi-continuous ion exchange based on a movable bed of thermally regenerable resin in a single column.

In ion exchange treatments using ion exchange resins of the type which are regenerated with chemical reagents, when the treatment is performed in a fixed bed-type ion exchange system, the ion exchange treatment and the regeneration treatment are not performed simultaneously within one and the same column. Rather, one of the two treatments is shut down while the other treatment is in progress. In an improvement on such system, a continuous moving bed-type ion exchange system has been developed and is in practical use. However, the improved system nevertheless has the disadvantage that the cost of equipment is high because a separate regeneration column must be installed in addition to the ion exchange column.

Thermally regenerable resins, such as those used in the present invention, are resins which, unlike any of the conventional ion exchange resins capable of being regenerated in ion exchange capacity by the use of chemical reagents (such as aqueous solutions of acids and alkalis), can have their ion exchange capacity regenerated by hot water alone. Such resins are now commercially available, one example being "Amberlite" (registered trademark) XD-2, a product of Rohm and Haas Company, United States.

Accordingly, an object of this invention is to provide a process and apparatus requiring only a single column, wherein the column is packed with a heterogeneous thermally regenerable resin, thus permitting an ion exchange treatment and a regeneration treatment to be carried out continuously and efficiently.

In the regeneration of a thermally regenerable resin, it is naturally desirable from the standpoint of economics to decrease as much as possible the amount of hot water used for the regeneration. In an up-flow type treating column, the raw liquid must be fed at a rate high enough to keep the thermally regenerable resin under sufficient upward force to ensure thorough ion exchange reaction. For this reason, the lower limit of flow rate of raw liquid is fixed by the specific gravity of the resin and other factors. If the flow rate is below this lower limit, it becomes necessary to take a counter measure, such as forming a supporting zone beneath the regeneration zone of thermally regenerable resin and feeding this supporting zone with sufficient water to increase the flow rate above such lower limit, thereby to support the resin in the regeneration zone in a relatively fixed position. It is also necessary to interpose a heat displacement zone between the regeneration zone and the supporting zone to prevent possible loss of heat due to diffusion of heat below the regeneration zone.

To attain these objectives, experiments were conducted using a regeneration column having disposed therein a heat displacement zone immediately followed by a supporting zone. It was learned in the experiment that part of the water used as the supporting water would immediately undergo an ion exchange reaction (such as desalination). Having studied the effect of this supporting water in combination with the effect of the immediate ion exchange reaction on the water, the idea was conceived of having the ion exchange treatment and the regeneration treatment performed in a single column, disposing in this column a loading zone at a location corresponding to that of the supporting water function, and causing the flow of the raw liquid to play the part of supporting water. This conception is embodied in the present invention.

SUMMARY OF THE INVENTION

Briefly, the invention is a process for continuous or semi-continuous ion exchange treatment based upon a column packed with a heterogeneous thermally regenerable ion exchange resin in a single bed wherein the bed has a loading zone, a heat displacement zone above the loading zone, and a regeneration zone above the heat displacement zone. In the process, the essential steps are:

(a) flowing an aqueous feed liquid having an undesirably high concentration of ions upwardly through the loading zone to substantially reduce the concentration of ions, and withdrawing resultant treated liquid as product liquid from the vicinity of the top of the loading zone with the remainder of product liquid flowing upwardly into the heat displacement zone;

(b) flowing an aqueous liquid regenerant at a higher temperature than the temperature of the feed liquid, through the resin in the regeneration zone to regenerate the resin;

(c) controlling the flow of aqueous liquid in the heat displacement zone to the extent necessary to maintain a temperature differential between the loading zone and the regeneration zone;

(d) transferring loaded resin from the loading zone to the regeneration zone; and (e) displacing regenerated resin downwardly in the column to replace the transferred resin.

Steps (a) and (b) may be effected simultaneously or independently. Preferably, a portion of the product liquid removed from the loading zone in step (a) is heated and utilized as the hot regenerant liquid in step (b).

In another aspect, the process is practiced by pulsing, utilizing in each pulse the steps of:

(1) discontinuing the flow of aqueous feed liquid in step (a) while draining feed liquid from the loading zone, for a period of time effective for displacement of resin downwardly in the column, and (2) thereafter reactivating the flow of aqueous feed liquid while discontinuing the draining of feed liquid from the loading zone, entraining loading resin with a portion of feed liquid to form a resin slurry, and transferring the resin slurry to the regeneration zone.

The invention further includes apparatus comprising the aforementioned column, associated liquid and resin transfer lines, and resin feed means.

DETAILED DESCRIPTION

Figure 1:
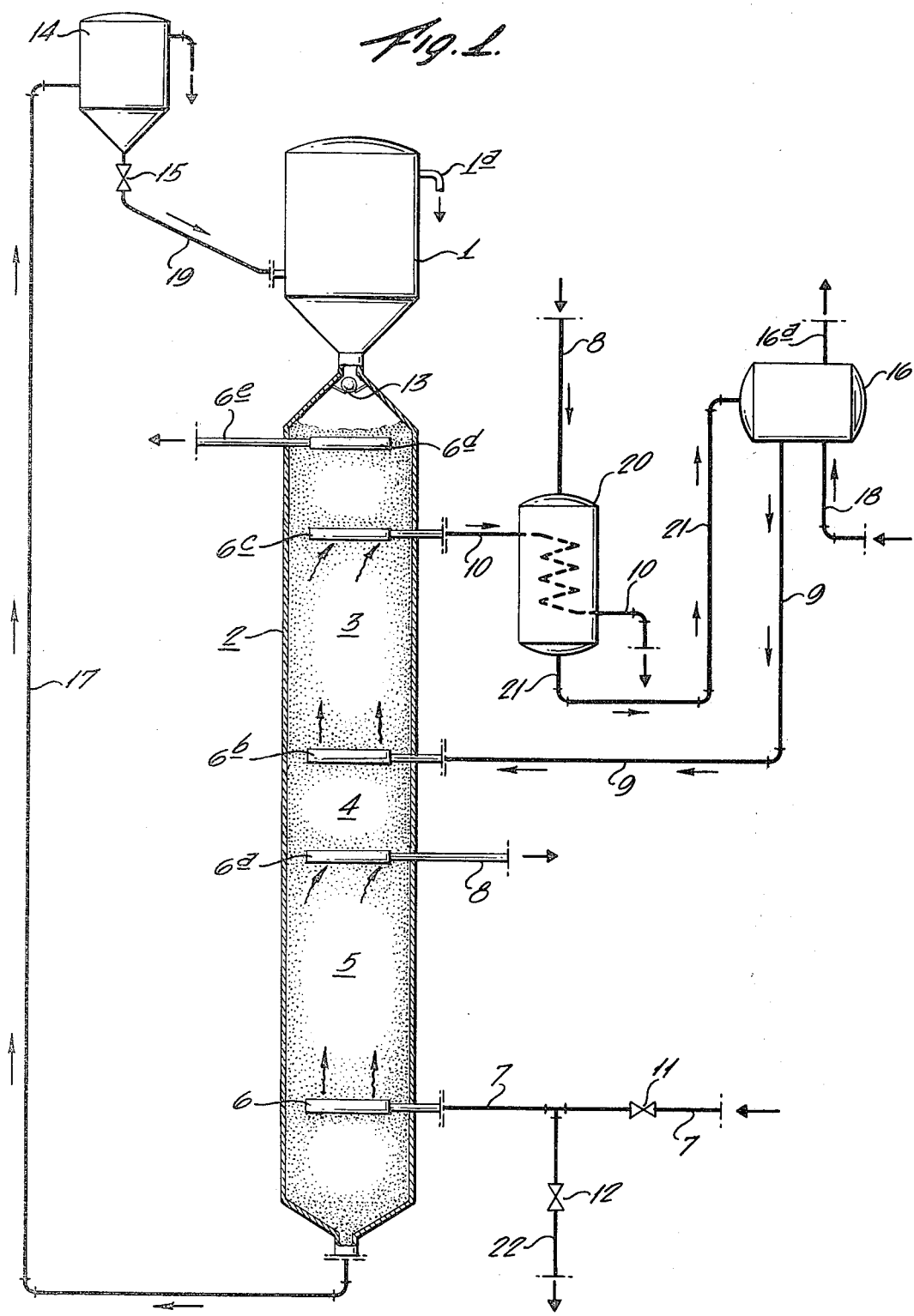

Reference is made to the accompanying drawing for illustration of the invention, in which:

FIG. 1 is a schematic view of an ion exchange apparatus and system of the invention; and FIG. 2 graphically illustrates typical steady state operating conditions for the process of the invention.

The thermally regenerable resins useful in the present invention are "heterogeneous thermally regenerable resins". These are thermally regenerable ion exchange resins having mixed ion exchange functional units within a single particle as distinguished from the so-called "mixed beds" known in the art which consist of a physical admixture of cationic resins and anionic resins. Heterogeneous resins useful in the present process include "hybrid" ion exchange resin materials (see, for example, U.S. Pat. No. 3,991,017 issued Nov. 9, 1976), various "composite" ion exchange materials formed by binding acidic and basic functional resins within a single particle (see, for example, U.S. Pat. No. 3,645,922 issued Feb. 29, 1972) and "flocks" or dispersions of finely divided particles (micron sized) having mixed functionality held together by electrostatic charge or the like. In addition to the preferred resins mentioned above the heterogeneous resins include amphoteric resins or various types wherein mixed functional groups are contained within particles on a molecular level (e.g., along a polymer chain). Such amphoteric resins may be useful in the process if they are capable of thermal regeneration. The foregoing class of materials include the so-called "ion retention agents". (See, for example, U.S. Pat. No. 3,351,549, issued Nov. 7, 1967). The patents cited above are hereby incorporated herein by reference.

With reference to the drawing, which is representative of a treatment for desalination, a vertical treating column 2 having a main resin feed hopper 1 disposed thereon is packed with a thermally regenerable resin in the form of a bed divided into a regeneration zone 3, a heat displacement zone 4 and a loading zone 5 in descending order in the column. Liquid distributing means such as a distributor plate 6 or similar device is positioned at the lower end of the loading zone 5. Raw feed liquid (such as sea water) is admitted to loading zone 5 through a raw liquid feed line 7 incorporating a valve 11. At the upper level of loading zone 5, a treated liquid effluent line 8 is connected to column 2 via distributor 6a. (The distributors herein designated as 6, 6a, 6b, 6c and 6d are known liquid distributing devices, such as perforated vessels generally concentric with the column but having a diameter less than the column to permit resin flow around the vessel).

At the lower level of the regeneration zone 3, a hot liquid regenerant entry line 9 from a heating deaerator 16 (a known device) having a steam line 18 is connected to column 2 via distributor 6b. At the upper level of the regeneration zone 3 a spent liquid regenerant exit line 10 leads to a heat exchanger 20 from a distributor 6c in column 2. Heat exchanger 20 and heat deaerator 16 communicate by a heat recovery line 21 and serve to recover heat from the spent water, and in the case of the deaerator, to remove bubbles of oxygen from hot water destined to enter column 2 via line 9.

The bottom of treating column 2 and the upper portion of a resin metering hopper 14 communicate through a resin transfer line 17 which serves to convey the portion of thermally regenerable resin which has adsorbed ions thereon and which are fallen to the vicinity of the inner bottom of column 2. The bottom of metering hopper 14 and the upper portion of main hopper 1 communicate via a transfer line 19 having a valve 15.

In operation, valve 11 is opened to deliver raw liquid to be ion exchanged upward through the distributor 6 into loading zone 5 to undergo desalination by the action of the thermally regenerable resin which is in a regenerated state. The raw liquid has a temperature lower than that of the hot regeneration liquid (which, as indicated, may also be liquid which has been ion exchanged in accordance with the invention). The resulting ion-exchanged (demineralized) liquid is discharged through the treated liquid line 8 in the upper level of loading zone 5. At the same time, hot liquid for regeneration, commonly hot water, is introduced via the hot water line 9 for up-flow into the regeneration zone 3 so as to regenerate the ion adsorbed (loaded) thermally regenerable resin. After the regeneration, the spent water is discharged through the spent water line 10 in the upper level of the regeneration zone 3. The spent water may be passed through the heat exchanger 20 and the heat recovery line 21, with the result that the heat of the spent water is recovered by the heat exchanger 20 16. The ion exchange (desalination) treatment and the regeneration treatment may be carried out independently of each other by utilizing as the liquid regenerant, a stream other than the treated liquid stream from line 8. However, a portion of the treated liquid stream of line 8 is an ideal liquid for regeneration since the liquid is low in interfering ion content.

After the raw liquid and the regeneration liquid have been delivered as described above for respectively fixed periods, the system is pulsed at intermittent intervals, either manually or by using known automatic valve control means. The pulsing steps are as follows. Valve 11 in the raw liquid line 7 is closed to discontinue the supply of raw liquid, and the valve 12 in the raw liquid withdrawal line 22 branching off the raw liquid line 7 is opened to withdraw a predetermined volume of raw liquid from within column 2. By so doing, the thermally regenerable resin which has adsorbed ions and is now retained in the lower portion of the loading zone 5, is caused to fall below the distributor 6 and, at the same time, the entire bed of thermally regenerable resin falls downwardly. This lowering of the entire bed of thermally regenerable resin may also be achieved by removing the portion of loaded resin which is in the bottom of column 2. Simultaneously, the ball check valve 13 for checking backflow, which is interposed between the hopper 1 and the treating column 2, falls and synchronously permits the resin stored in hopper 1 and which requires regeneration, to fall into column 2. The resin is normally in slurry form. Excess water may be removed from the slurry via distributor 6d and a slurry water effluent line 6e. Then, as valve 12 in the raw liquid withdrawal line 22 is closed, the valve 11 and the raw liquid line 7 is opened and the introduction of raw liquid restarted. Consequently, ball check 13 rises to discontinue the fall of the resin. The portion of the ion adsorbed resin which has fallen below the raw liquid distributor 6 is caused by the pressure of the raw liquid to flow through transfer line 17 and thus to reach the metering hopper 14 for storage therein. By opening valve 15 and transfer line 19, the resin in metering hopper 14 is transferred to and stored in the hopper 1, awaiting the subsequent repacking of column 2. Generally, hopper 1 has a larger inner volume than the metering hopper 14 and is utilized for receiving freshly supplied thermally regenerable resin and for removal of exhausted (crushed) resin via line 1a. Means for separation of crushed resin from fresh resin or resin to be regenerated are well-known, such as particle classifying baffles, sleeves and the like. Such devices commonly utilize a back-washing procedure, also well-known in the art.

The heat displacement zone 4 serves to cool the regenerated and consequently hot resin and, at the same time, functions as a buffer between regeneration zone 3 and loading zone 5. Stated otherwise, the heat displacement zone separates the loading and regeneration zones in order to minimize thermal dispersion. Without the heat displacement zone, the loading zone would tend to be unduly warm and the regeneration zone would tend to be unduly cool, thus lowering the working resin capacity of the system. Suitable valving and control devices (not shown) may be included to close or open the valves controlling the flow in lines 9 and 10, thus controlling the dimensions of the heat displacement zone.

Such conditions as flow rate and temperature of the raw liquid and the regeneration liquid, and intervals of time for introduction and withdrawal of the liquids, are suitably fixed in accordance with the character and capacity of the thermally regenerable resin, quality of the raw liquid, and other similar conditions of treatment. Also, such factors as diameter and length of the treating column 2 and lengths of the zones within the column may be fixed to suit the capacity of the thermally regenerable resin and other operating conditions. Preferred operating temperatures are 10°–20° C. (loading zone) and 90°–95° C. (regeneration zone) but wide variation is possible.

In the manner described above, regenerated and cooled thermally regenerable resin is constantly supplied to the loading zone 5 in treating column 2. Since the thermally regenerable resin at its optimum adsorbing capacity is constantly supplied to the upper portion of the loading zone 5, the ion exchange and regeneration treatments can be efficiently effected within one treating column. It is further possible to obtain treated water continuously with intermissions for withdrawal of the raw liquid.

Further in the present invention, the heat displacement zone 4 prevents the hot water for regeneration from losing heat through diffusion and, where necessary, the heat exchanger may be used to recover the heat from the spent regeneration water. Thus, the heat efficiency is so high that, even if the ratio of the volume of the hot water for regeneration to that of the thermally regenerable resin in circulation is lowered to 0.5, thorough and effective regeneration can be obtained. Thus, the amount of hot water used for regeneration is notably small. The heat deaerator 16, which is optionally used to treat the hot regenerant water, provides ample and effective oxygen removal (via line 16a) and consequently contributes to lengthening the service life of the thermally regenerable resin.

Moreover, since in this invention the treating column will suffice for the ion-exchange treatment, the ion-exchange system is less expensive to manufacture than the continuous moving-bed type ion exchange system which has an adsorption column and a regeneration column disposed separately of each other, therefore requiring lines, valves and control mechanisms for each of the two columns. The one-column system of the invention is operated very simply, dispenses with complicated plant management, and brings about a notable reduction in the unit cost of treatment.

Compared with the two-column type treating system, the system of the present invention offers minimal liquid loss during the withdrawal and transfer of liquid because the resin beads subsequent to the fall of resin bed within the treating column are recompacted and the number of transfers of resin outside the treating column are respectively halved. At the same time, the possibility of size reduction of the resin beads due to friction is small. Thus, the system enjoys the advantage that the volume of water required per unit volume of water treated is improved and the service life of the resin is lengthened.

While in its preferred aspects the process of the invention is operated continuously or semi-continuously, in the sense of steady state (equilibrium) conditions providing essentially uninterrupted production of treated liquid, the process may also be operated batchwise, wherein the liquid flows, and resin displacements and transfers are lengthened, interrupted irregularly, or activated independently.

The invention has particular benefit for desalination of industrial, municipal and household waters but is also beneficial for removal of salts and other compounds from sea water and other sources.

While it is preferred to use a portion of the treated liquid product effluent from line 8 as regenerant liquid, any other aqueous fluid low in dissolved salts must also be utilized, alone or in combination with the liquid product. Such other fluids include various forms of purified water such as previously softened or deionized water.

The process and apparatus described herein may be combined with other new or known methods of deionizing aqueous streams or regenerating resins, the former embracing such techniques as filtration, ultrafiltration (see copending U.S. Patent Application Ser. No. 790,523 filed Apr. 25, 1977 assigned to the assignee hereof), and ion exchange with the latter including techniques for regenerating a second ion exchange bed with the spent regenerant effluent from a first zone or bed (see copending U.S. Patent Application Ser. No. 802,142 filed May 31, 1977 assigned to the assignee hereof). In particular, it is common to remove ions which interfere with sorbtion of a thermally regenerable bed by means of pretreatment of an influent in a separate ion exchange column located upstream of the thermally regenerable bed (supra U.S. Ser. No. 802,142). The cited patent applications are incorporated herein by reference.

The invention is further described below with reference to typical working examples and FIG. 2.

EXAMPLE 1

Apparatus essentially as depicted in FIG. 1 was set up. The treating column was 7 m. in height and 0.25 m. in diameter and had a regeneration zone 2 m. in height in the upper section, a heat displacement zone 1 m. in height below the regeneration zone and a loading zone 2.5 m. in height below the heat displacement zone. As a heterogeneous thermally regenerable resin, Amberlite (registered trademark) XD-2 resin (product of Rohm and Haas Company, United States) was used. In the system thus formed, a continuous desalination treatment was carried out using the following conditions. The volume of thermally regenerable resin circulated for the unit time (hours), namely, the inner volume of the metering hopper, was 120 liters, the volume of hot water for regeneration fed per hour was 60 liters, the temperature of the hot water was fixed at 90° C. and raw water containing 1,100 ppm (as $CaCO_3$) of dissolved salts (NaCl, $Na_2SO_4$) and kept at 16.5° C. was treated at a rate of 920 liters per hour. Consequently, there was obtained demineralized water containing 350 ppm (as $CaCO_3$) of dissolved salts. Both the water for regeneration and the raw water were fed upflow and the resin was caused to fall inside the treating column at fixed intervals of 3 minutes. The raw water was used as the hot water for regeneration. Heat was recovered from the spent regeneration water by passage through a plate type heat exchanger. The raw water was preheated with this recovered heat up to 57° C. and further heated by introduced steam up to 90° C. The hot water thus obtained was then deaerated and thereafter put to use.

As a result, for 1 liter (0.115 equivalent) of the thermally regenerable resin, desalination was obtained at a rate of about 6.5 meq. per Kcal of heat. After 4,000 hours of operation, the rate of comminution of the thermally regenerable resin as determined in the proportion of comminuted resin beads passing a 50-mesh sieve was less than 1% compared with about 2% obtained in the conventional two-column type treating system.

EXAMPLE 2

A feed water containing about 1000 ppm (as $CaCO_3$) of dissolved salts (NaCl, $Na_2SO_4$) is treated in a system essentially as illustrated in FIG. 1 and as described in Example 1, except that the column height is 5.1 m., column diameter is 25 cm., and the lengths of the loading, heat displacement and regeneration zones are 2 m., 80 cm. and 1.5 m., respectively. The loading zone is at a temperature of about 20° C. and the regeneration zone is at a temperature of about 90° C. The feed water enters the bottom of the column at a flow rate of 1.35 $m^3$/hr., of which 1.00 $m^3$ is recovered as treated product water containing about 100 ppm (as $CaCO_3$) of the dissolved salts, and the remainder is used to entrain loaded resin to form a resin slurry for transfer to the metering hopper and to drop the resin bed during each pulse. The system is operated by pulsing, typically as follows:

(a) Valve 12 (FIG. 1) is opened for 15 seconds while valve 11 in feed line 7 is closed. This provides a net water flow down the column of 16⅔ liters through the drain line 22, causing the resin bed to drop and to pack at the bottom of the column.

(b) Valve 12 is then closed and valve 11 opened for 3 min. and 45 sec. The liquid flow is thereby split into two directions: 66⅔ liters moves upwards above feed line 7 and 6⅔ liters moves out through line 7 entraining 8 liters of resin.

The foregoing procedures of Examples 1 and 2 provide continuous water flow and treatment although it will be noted that resin flow is not continuous. Resin flow is controlled by the metering hopper 14. For example, under the conditions set forth in this example, once the 8 liters of resin are transferred via the resin slurry, the metering hopper is filled and no more resin can be transferred until the hopper empties in the next pulse. However, the main resin hopper 1 may initially contain enough resin for several pulses.

FIG. 2 illustrates steady state conditions along the length of a column operated as described in Example 2. FIG. 2 shows the relationship between temperature, concentration of salts in feed and product streams, and resin condition at discrete points in the column. It will be noted that the temperature gradient is such as to maximize both the loading and the regeneration treatments.

It will be evident from the foregoing description and Examples 1 and 2 that the steady state conditions are achieved by pulsing wherein each pulse comprises the steps of:

(1) discontinuing the flow of feed liquid while draining feed liquid from the loading zone, over a period of time effective for displacement of resin downwardly in the column, followed by (2) reactivating the flow of feed liquid upwardly through the loading zone while discontinuing the draining of feed liquid, entraining loaded resin to form a resin slurry, and transferring the resin slurry to the regeneration zone.

The frequency and length of the pulses as well as the periods of activation or inactivation of the conditions comprising the steps of each pulse, may be varied in accordance with resin capacity, salt content of feed liquid, desired quality of products, dimensions of the column and zones thereof, and similar parameters.

We claim:

1. A process for continuous ion exchange treatment utilizing a column packed with a single bed of heterogeneous thermally regenerable ion exchange resin, said bed having a regeneration zone in the upper portion of the bed, a loading zone in the lower portion of the bed, and a heat displacement zone between said regeneration and loading zones for minimizing heat dispersion, said process comprising the steps of:

(a) flowing an aqueous feed liquid having an undesirably high concentration of ions upwardly through said loading zone to substantially reduce the concentration of ions, and withdrawing resultant treated liquid as product liquid from the vicinity of the top of the loading zone with the remainder of product liquid flowing upwardly into the heat displacement zone;

(b) flowing an aqueous liquid regenerant at a higher temperature than the temperature of the feed liquid, through the resin in the regeneration zone to regenerate the resin;

(c) controlling the flow of aqueous liquid in the heat displacement zone to the extent necessary to maintain a temperature differential between the loading zone and the regeneration zone;

(d) transferring loaded resin from the loading zone to the regeneration zone; and (e) displacing regenerated resin downwardly in said column to replace said transferred resin.

2. The process of claim 1 wherein the flow of aqueous liquid in the regeneration zone in step (b) is countercurrent to the downward displacement of resin therethrough.

3. The process of claim 2 wherein the aqueous liquid regenerant is fed into the regeneration zone at the lower boundary thereof and removed from the regeneration zone at the upper boundary thereof.

4. The process of claim 1 wherein loading step (a) and regeneration (b) are effected simultaneously.

5. The process of claim 1 wherein loading step (a) and regeneration (b) are effected independently.

6. The process of claim 1 wherein regenerated resin is displaced downwardly in said column in step (e) by reversing the flow of feed liquid in said loading zone.

7. The process of claim 1 wherein regenerated resin is displaced downwardly in said column in step (e) by discontinuing the flow of feed liquid into the loading zone and withdrawing loaded resin therefrom.

8. The process of claim 1 wherein a portion of the feed liquid entrains loaded resin in the loading zone, whereby said loaded resin is transferred in step (d) as a resin slurry.

9. The process of claim 1 wherein a portion of said product liquid is heated and utilized as the aqueous liquid regenerant in step (b).

10. The process of claim 1 wherein the temperature of the loading zone during step (a) is about 10°-20° C. and the temperature of the regeneration zone during step (b) is about 90°-95° C.

11. The process of claim 1 wherein said aqueous regenerant liquid is fed into the regeneration zone at the lower boundary thereof and said product liquid is removed from the loading zone at the upper boundary thereof, said boundaries defining said heat displacement zone, and wherein the flow of aqueous liquid is controlled in step (c) by temperature responsive valve means controlling said feeding of regenerant liquid and said removal of product liquid.

12. A process as in claim 1 characterized by intermittently pulsing as follows:
    (1) discontinuing said flow of aqueous feed liquid in step (a) while draining feed liquid from the loading zone, for a period of time effective for displacement of resin downwardly in said column, and
    (2) thereafter reactivating said flow of aqueous feed liquid while discontinuing said draining of feed liquid from the loading zone, entraining loaded resin with a portion of feed liquid to form a resin slurry, and transferring said resin slurry to the regeneration zone.

13. Apparatus for continuous ion exchange treatment, comprising a column packed with a single bed of a heterogeneous thermally regenerable resin, said bed having an adsorption zone in the upper portion of the bed, a loading zone in the lower portion of the bed, and a heat displacement zone between the loading and regeneration zones, said apparatus further including a feed line to said loading zone for feeding an aqueous feed liquid having an undesirably high concentration of ions to said loading zone, a drain line to said loading zone for draining said feed liquid therefrom, resin feed means for feeding loaded resin to said regeneration zone, a resin transfer line for transferring loaded resin from said loading zone to said resin feed means, an effluent line for removing product liquid from said loading zone, and hot liquid regenerant entry and exit lines to said regeneration zone.

14. Apparatus as in claim 13 further including liquid distributor means in said column, a first said means positioned at the lower boundary of said loading zone, and second and third said means substantially defining the lower and upper boundaries of said heat displacement zone, said feed line being connected to said first distributor means, and said hot liquid entry and exit lines being connected to said second and third distributor means, respectively.

15. Apparatus as in claim 13 wherein said resin feed means comprises a first resin hopper connected to said regeneration zone of said column and a second hopper for feeding measured amounts of loaded resin to said first hopper, said first hopper being adapted for supplying fresh heterogeneous thermally regenerable resin to said column and for separating crushed, waste resin from said fresh resin and said loaded resin.

16. Apparatus as in claim 13 further including heat exchange means for transferring heat from said liquid regenerant, after said liquid regenerant leaves said regeneration zone, to incoming regenerant liquid.

* * * * *